US012562045B2

(12) United States Patent
Badic

(10) Patent No.: US 12,562,045 B2
(45) Date of Patent: Feb. 24, 2026

(54) WEARABLE DEVICE USED AS DIGITAL POOL ATTENDANT

(71) Applicant: Apple Inc., Cupertino, CA (US)

(72) Inventor: Biljana Badic, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/371,327

(22) Filed: Sep. 21, 2023

(65) Prior Publication Data

US 2024/0105043 A1 Mar. 28, 2024

Related U.S. Application Data

(60) Provisional application No. 63/409,655, filed on Sep. 23, 2022.

(51) Int. Cl.
*G08B 21/08* (2006.01)
*G08B 31/00* (2006.01)

(52) U.S. Cl.
CPC .......... *G08B 21/088* (2013.01); *G08B 31/00* (2013.01)

(58) Field of Classification Search
CPC .............................. G08B 21/088; G08B 31/00
See application file for complete search history.

(56) References Cited

U.S. PATENT DOCUMENTS 6,154,140 A * 11/2000 Thorpe ................ G08B 21/088 340/626
9,858,793 B2 * 1/2018 Hawsah ............... G08B 21/088
10,824,954 B1 * 11/2020 Tilton .................... G06V 40/25
11,159,769 B2 * 10/2021 Mor ........................ G06V 40/23
2018/0043210 A1 * 2/2018 Niehaus ................ A61B 5/1118
2018/0056128 A1 3/2018 Narasimha et al.
2020/0376335 A1 * 12/2020 Wan ................... A63B 71/0622
2020/0380843 A1 * 12/2020 Bodi .................. G08B 21/0446
2022/0122431 A1 * 4/2022 Barton ...................... G06T 7/80

FOREIGN PATENT DOCUMENTS

CN 111638751 B * 11/2023 ............. G06F 1/163
WO WO-2018225984 A1 * 12/2018 ......... G08B 21/0258
WO WO-2022136819 A1 * 6/2022 ............. G08B 29/18
WO WO-2023282773 A1 * 1/2023 ........... G08B 21/088

OTHER PUBLICATIONS

Tonolini et al., "Networking across Boundaries: Enabling Wireless Communication through the Water-Air Interface," ACM SIGCOMM 2018 Conference, Aug. 20-25, 2018, Budapest, Hungary, pp. 117-131.

* cited by examiner

*Primary Examiner* — Curtis A Kuntz
*Assistant Examiner* — James E Munion
(74) *Attorney, Agent, or Firm* — Fish & Richardson P.C.

(57) ABSTRACT

Embodiments are disclosed for a wearable device used as a digital pool attendant. In some embodiments, a method comprises: determining, with at least one processor of a wearable device, whether a user is swimming or not swimming based on sensor data; in accordance with the user not swimming, determining with the at least one processor and based on the sensor data, whether the user is showing regular or irregular behavior while swimming; and in accordance with the user showing irregular behavior, sending an alert message from the water over air to one or more other devices.

19 Claims, 8 Drawing Sheets

WEARABLE DEVICE USED AS DIGITAL POOL ATTENDANT

CROSS-RELATED APPLICATIONS

This application claims the benefit of priority from U.S. Provisional Patent Application No. 63/409,655, filed Sep. 23, 2022, for "Apple Watch as Pool Attendant," which provisional patent application is incorporated by reference herein in its entirety.

TECHNICAL FIELD

This disclosure relates generally to pool alarm systems and methods for detecting when swimmers are in distress or drowning.

BACKGROUND

Every year more than 3,500 people in the United States die from drowning. Drowning is also the fifth most common cause of accidental death in the country and most people who die by drowning are children. The average person can hold breath for about 30 seconds. For children, the length is shorter. A person who is in excellent health and has training for underwater emergencies can still only hold their breath for about 2 minutes. If a person is submerged 4-6 minutes in water without resuscitation, brain damage and eventually death by drowning will occur.

To prevent drowning accidents, drowning prevention systems have been developed that use camera surveillance systems to detect when a swimmer is in distress. For example, SwimEye™ uses a live video stream from underwater cameras to automatically monitor for swimmers in distress using object recognition software. When SwimEye™ detects a swimmer in distress on the bottom of the pool, it raises a radio alarm to pool lifeguards and a visual alarm to a monitoring and control station.

Such a system, however, can be expensive as it requires the installation and maintenance of the underwater cameras and monitoring and control station, making such a solution more suitable for large public pools operated by a city or business (e.g., hotels). Also, swimmers can block the underwater cameras in highly populated public pools, and larger swimmers (e.g., adults) can obscure smaller swimmers (e.g., children), causing the object detection software to detect frequent false positives or experience missed detections, and other problems associated with object detection systems when there are many moving objects to detect and track.

Accordingly, what is needed is a more simple and cost-effective solution to drowning prevention systems that can be deployed in every type of freshwater pool, including public and private swimming pools and also natural pools (e.g., lakes, ponds, etc.) where underwater cameras would be impractical to install.

SUMMARY

Embodiments are disclosed for a wearable device used as a digital pool attendant. In some embodiments, a method comprises: determining, with at least one processor of a wearable device, whether a user is swimming or not swimming based on sensor data; in accordance with the user not swimming, determining with the at least one processor and based on the sensor data, whether the user is showing regular or irregular behavior while swimming; and in accordance with the user showing irregular behavior, sending an alert message to one or more other devices.

Other embodiments are directed to an apparatus, system and computer-readable medium.

Particular embodiments described herein provide one or more of the following advantages. The disclosed pool alarm system and method uses wearable devices (e.g., smartphones, smartwatches, smart swim goggles, head, chest or leg mounted sensors, etc.) to provide a simple and cost-effective solution for pool alarm systems that can be deployed in every type of freshwater pool, including public and private swimming pools and also natural freshwater pools (e.g., lakes, ponds, etc.), where above-water and underwater cameras would be impractical.

Examples of use cases include but are not limited to sending an alarm message to nearby devices when a non-swimmer or small child unknowingly enters a deeper area of a swimming pool, sudden fatigue of a swimmer due to specific health issues, heart attack of a swimmer during a swim. The disclosed pool alarm system and method can be used as a standalone system or it can be integrated with other pool alarm or drowning detection systems for public swimming pools, including camera surveillance-based systems.

DETAILED DESCRIPTION

System Overview

Figure 1:
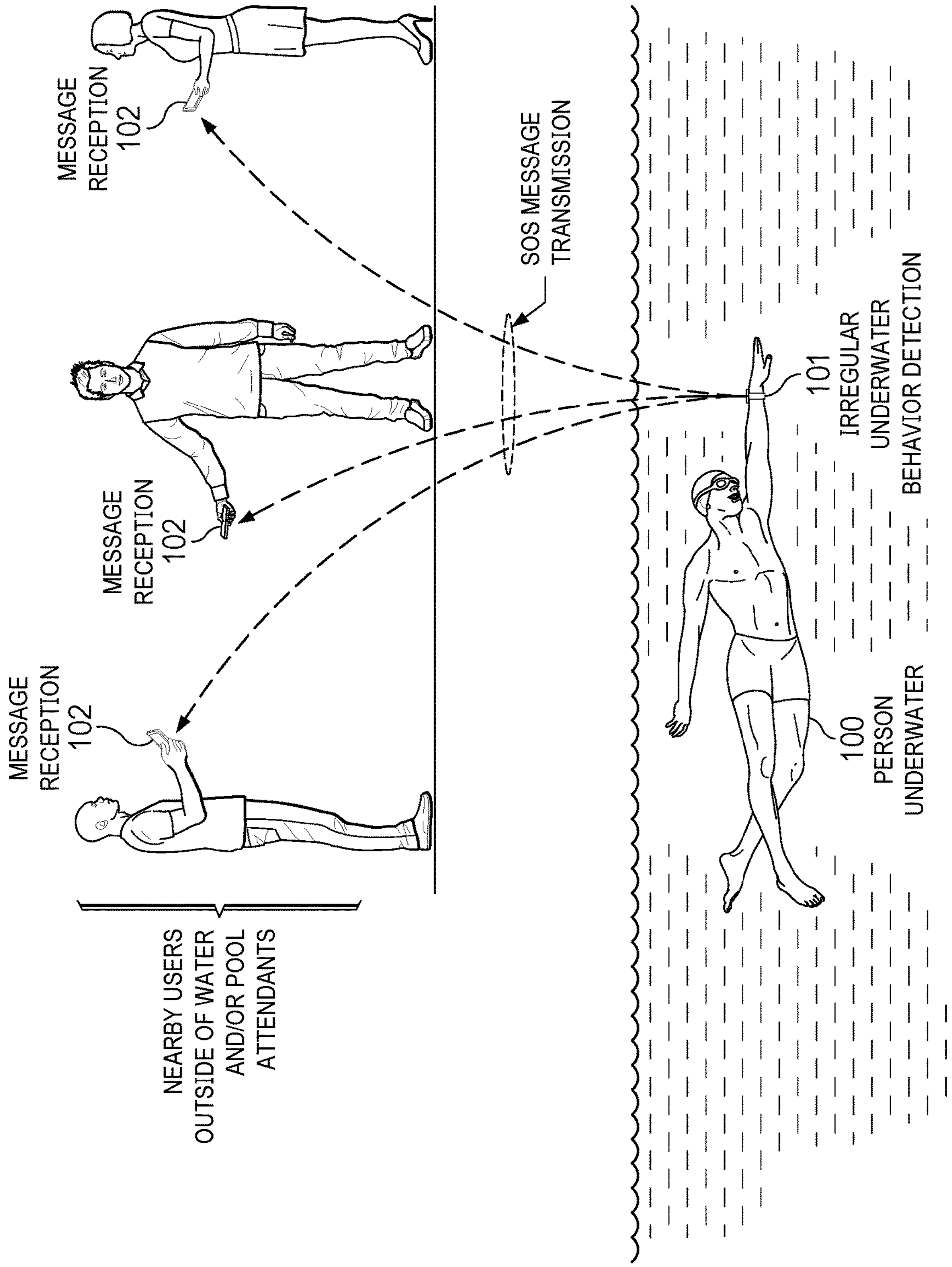
FIG. 1 is a system overview of a pool alarm system that uses wearable devices, according to one or more embodiments.

FIG. 1 is a system overview of a pool safety monitoring system that uses wearable devices, according to one or more embodiments. In the example scenario shown, user 100 is swimming and wearing a smartwatch on their wrist. The smartwatch includes a swimming analytics application that can determine limb coordination, swimming style and various other metrics and other information that are good indicators of swimming. In some embodiments, the swimming metrics and other information (e.g., heart rate, blood oxygen levels) are input into a machine learning model (e.g., a deep learning network) that has been trained to classify a swimmer showing regular or irregular behavior when in the water. When a swimmer is in distress (e.g., due to a heart attack), the user's underwater behavior becomes irregular as described in reference to FIG. 2. The irregular behavior is reflected in the swimming analytics metrics and other information, such as heart rate or other vital signs. In response to the machine learning model classifying the swimmer's behavior in the water, a wireless transceiver embedded on the smartwatch broadcasts a radio frequency (RF) message to nearby devices 102 in the pool or on the pool deck, such as smartphones, tablet computers, smartwatches, laptop computers, or a monitoring and control station, etc. The users of the nearby devices 102 are presented with the message on their respective displays, through an audible alert (e.g., a beep, siren, ringtone, spoken alert) and/or through haptic feedback (e.g., vibration) to get the attention of bystanders who can offer their assistance to the distressed swimmer or call for emergency first responders.

Figure 2A:
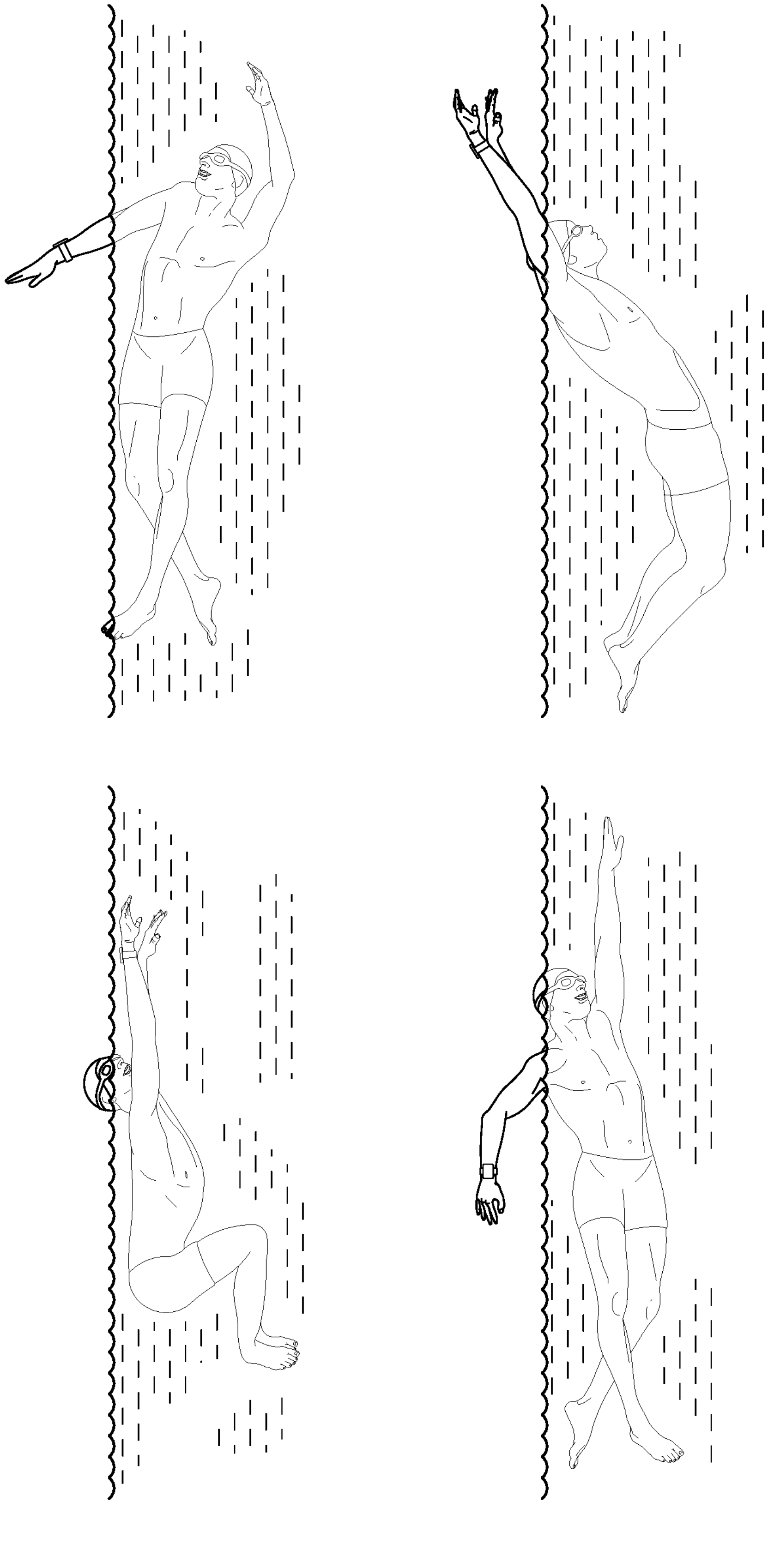
FIG. 2A-2C illustrate irregular underwater behavior detection, according to one or more embodiments.
Figure 2B:
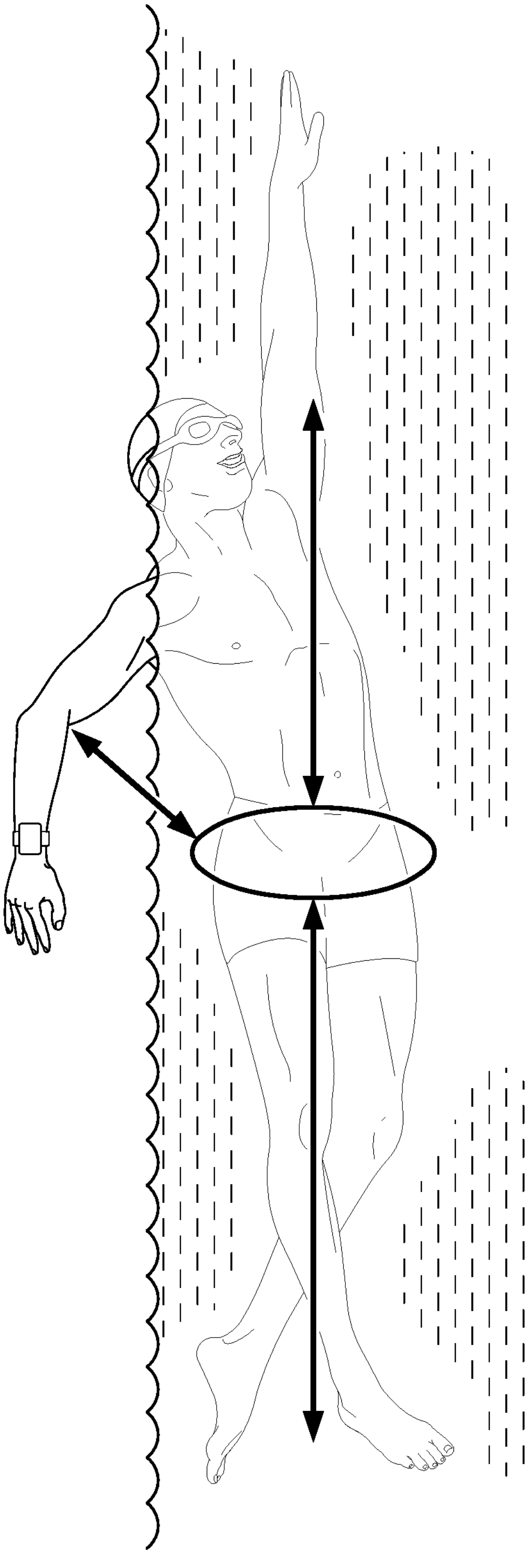
Figure 2C:
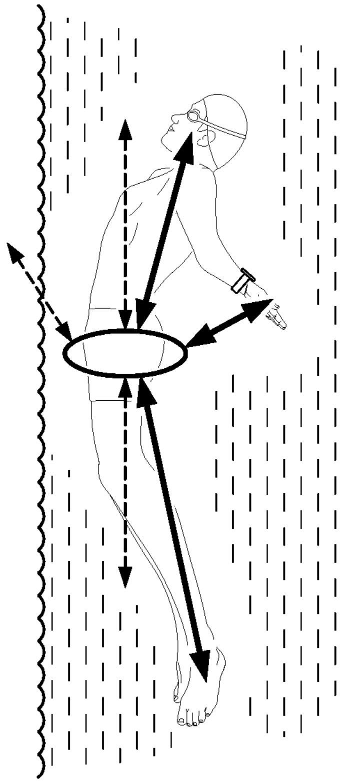
Figure 2C:
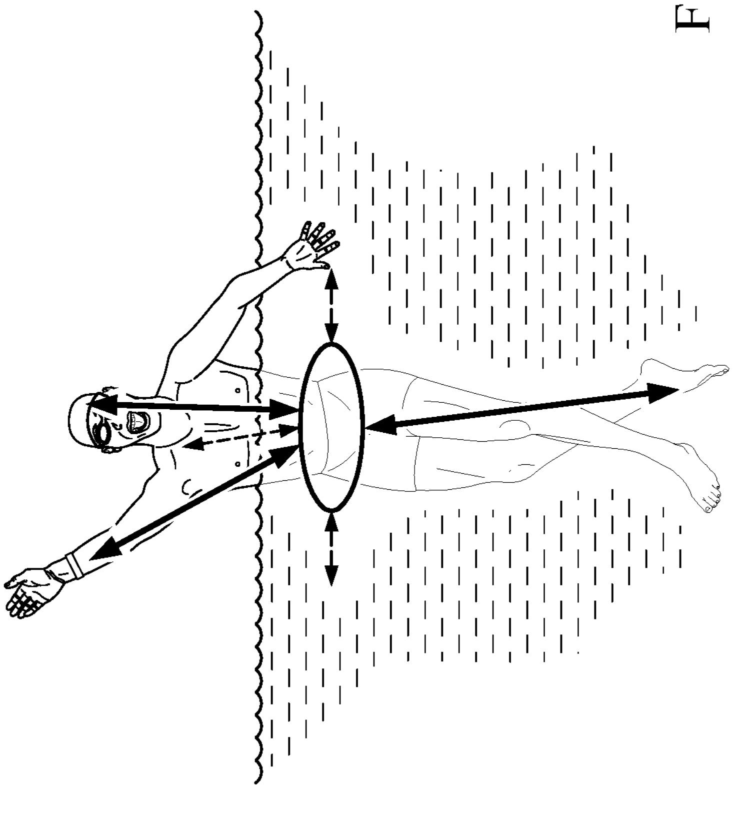

FIGS. 2A-2C illustrate irregular underwater behavior detection, according to one or more embodiments. FIG. 2A illustrates a swimmer's usual water position during a swim for different swim styles/strokes (e.g., freestyle, breaststroke, backstroke, butterfly). A human body in water is typically in a horizontal position and the position of the head and limbs are towards the hip. A significant deviation from this reference posture can indicate irregular behavior. FIG. 2B illustrates detection of a correct freestyle stroke.

FIG. 2C illustrates irregular behavior by the swimmer. For example, the relative positions of the swimmer's legs, torso, head and arms, can indicate irregular behavior associated with a swimmer in distress or a swimmer who is unconscious. Other positions can also be detected, including but not limited to a diving position, standing in water, etc. In addition to inertial sensors on the smartwatch, a heart rate sensor on smartwatch measures the swimmer's heart rate which may suddenly elevate when the swimmer is in a panic, or their blood oxygen level (e.g., VO2 max) may suddenly drop if the swimmer cannot breathe.

Figure 3:
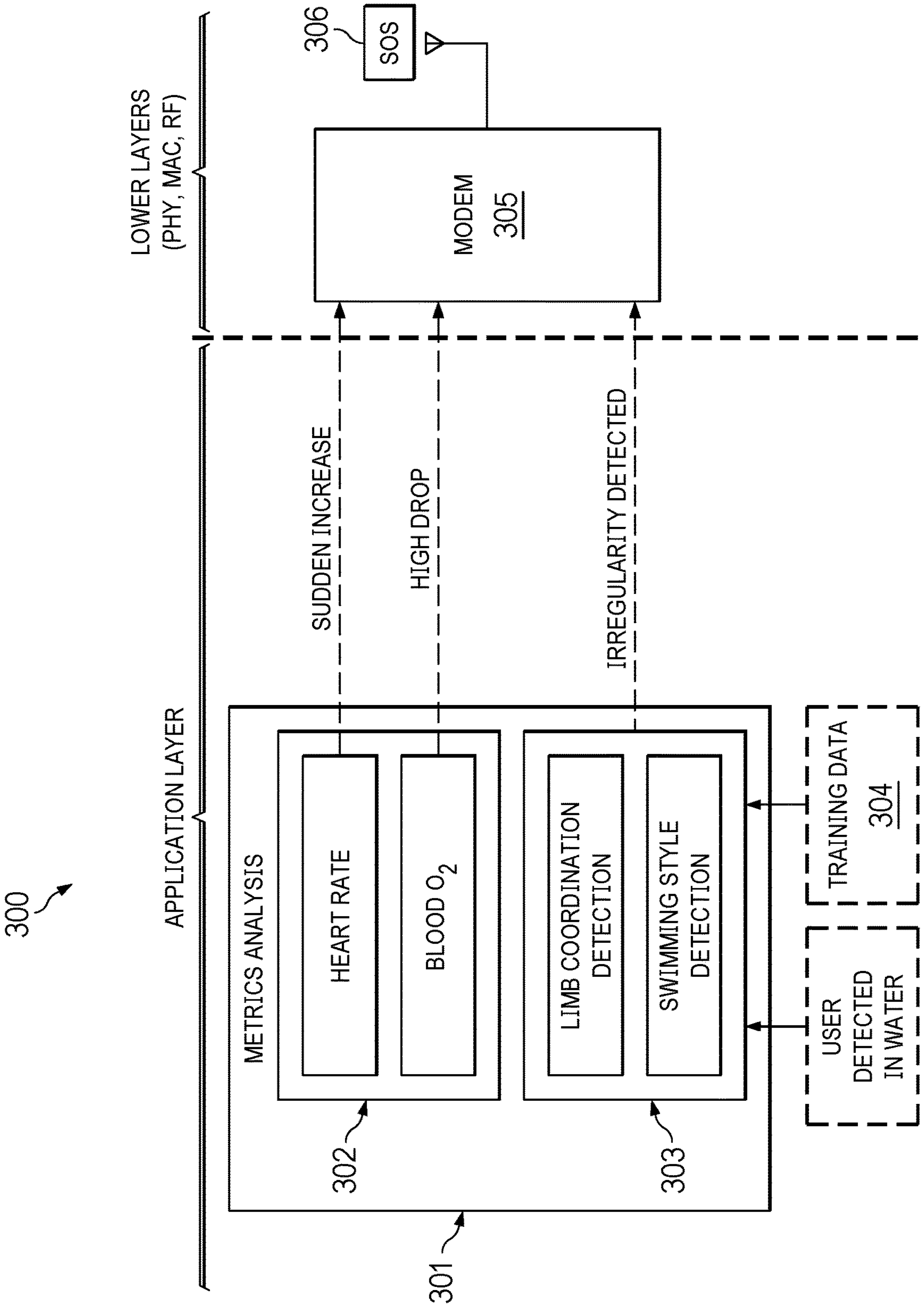
FIG. 3 is a block diagram of a pool alarm system that uses wearable devices, according to one or more embodiments.

FIG. 3 is a block diagram of a pool alarm system 300 that uses wearable devices, according to one or more embodiments. An application layer of system 300 includes metrics analysis 301, which includes biosignals 302 and swimming analytics 303. In some embodiments, metrics 303 are output by one or more a machine learning models (e.g., classifier, regression models). Metrics 303 are used as training data 304 to train the machine learning model(s) to predict that a user is swimming or not swimming and if not swimming, whether the swimmer is showing regular or irregular behavior in the water, and confidence levels for the predictions, such as probability value indicating the accuracy of the prediction.

In some embodiments, training data 304 comprises inertial signals (e.g., rotation rates, accelerations), biosignals 302 (e.g., heart rate, VO2 max), limb coordination metrics (e.g., relative positions of limbs with respect to the head) and swimming style metrics (e.g., freestyle, breaststroke, backstroke, butterfly) captured from swimmers of different age, height and weight. Training data 304 can include samples of regular and irregular behavior.

In some embodiments, a swimming analytics application 303 can use motion data, biosignals and speed data to determine if the user is engaged in swimming and a particular stroke style. An example of a swimming analytics application 303 that uses motion data from motion sensors of a smartwatch is described in United States Patent Publication No. US 2018/0056128 A1, published Mar. 1, 2018, for "Systems and Methods for Determining Swimming Metrics," which is hereby incorporated by reference herein in its entirety.

In US 2018/0056128 A1, accelerometer and gyroscope data are used to determine various swimming metrics, such as stroke rate, stroke style and motion energy. The stroke rate, stroke style, and motion energy metrics are combined with the user's heart rate (e.g., taken from a PPG sensor) and a user speed estimate to classify the user as either swimming or not swimming. In some embodiments, a Global Positioning System (GPS) receiver embedded in the smartwatch can provide the user speed estimate. If the user is classified as swimming, then the user is likely not in distress. If the user is classified as not swimming, then the user is either resting, an unskilled swimmer, a non-swimmer or in distress. In some embodiments, a pressure sensor in the wearable device is used to determine if the user is submerged in water either separately or in combination with the teachings of US 2018/0056128 A1.

If the user is classified as not swimming and the pressure sensor indicates that user is submerged in water, then a second classifier can be used to determine if the user is showing regular or irregular behavior in the water. In some embodiments, limb coordination metrics are input to the classifier. In some embodiments, limb coordination metrics are computed based on multiple sensors attached to the user's limbs (e.g., arms, legs) and the user's head (e.g., attached to a swim cap or swim goggles, embedded in an earplug). The wearable devices can include inertial sensors and wireless transceivers which allow the sensors to broadcast their inertial position and orientations through short range communication links (e.g., Bluetooth) to a central computing wearable device, such as a smartphone attached to the user's torso. The position and orientation information can be used to determine the relative position and orientation of the user's limbs to the user's head and hips in a reference frame of the central computing wearable device.

The relative positions and orientations, or metrics derived from the relative positions and orientations are input into a second classifier together with the user's heart rate or other biosignal (e.g., VO2 max). The second classifier is trained to predict regular or irregular behavior based on training data that comprises a large number of samples of regular and irregular behavior (e.g., irregular movement) of a user in the water. Thus, in some embodiments a first classifier classifies a user as swimming or not swimming, and if the user is swimming a second classifier classifies the user as showing regular or irregular behavior. If the user is swimming and showing irregular behavior as predicted by the classifiers, then an alert message 306 is sent through modem 305 to nearby devices 102 as described further in reference to FIG. 4.

Some examples, of irregular behavior are shown in FIG. 2C, where, for example, the user's arms are flailing above their head in a manner that is not indicative of swimming stroke. For example, regular swimming strokes tend to be periodic and if the arms of the user a flailing above their head in an aperiodic manner than such movements would indicate irregular behavior in the water. In another example if the position of a user's arms, legs and head are below their hips, as shown in FIG. 2C, this would indicate that the user may be unconscious. In another example, detections that the user is sinking or drifting could indicate irregular behavior.

In some embodiments, the sensors attached to the use's limbs and head can each include a pressure sensor. The measured pressures can be used to determine the depths of the user's limbs and head in the water relative to their hips. For example, if the user's arms and head are deeper in the water than their hips (FIG. 2C) that body orientation would indicate irregular behavior in the water.

Some examples of machine learning models that can be used to classify swimming/non-swimming and regular/irregular behavior include any suitable supervised or unsupervised machine learning model, including but not limited to regression models, decision trees, random forest, support vector machines, neural networks, classifiers, Naïve Bayes, clustering, etc.). If the machine learning model classifies the swimmer's behavior as regular or irregular, then an alert message (e.g., an SOS message) is transmitted to nearby devices 102, as described more fully in reference to FIG. 4.

Figure 4:
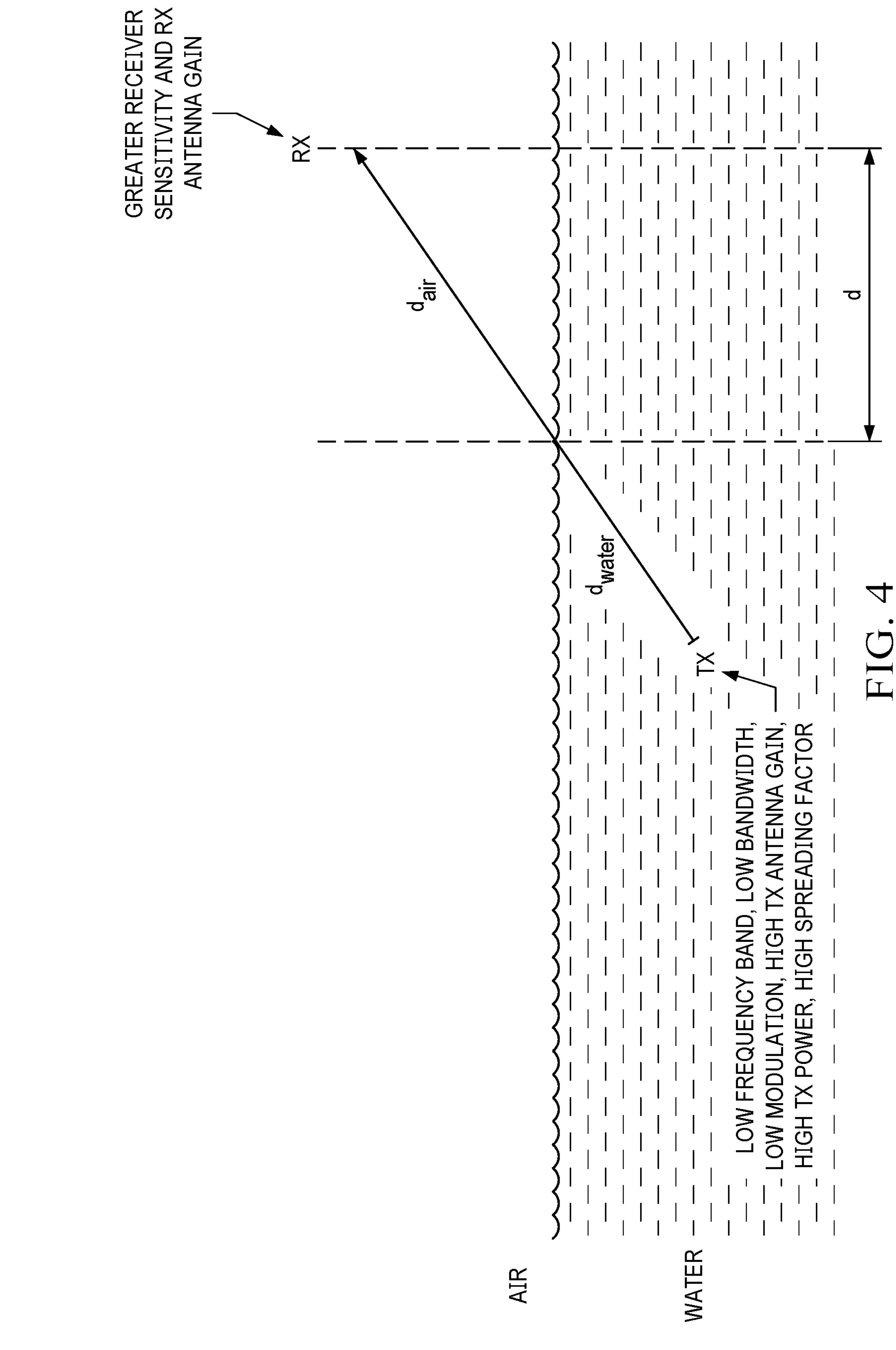
FIG. 4 illustrates a typical signal flow for water to air link and design aspects to be considered, according to one or more embodiments.

FIG. 4 illustrates a typical signal flow for a water to air link and design aspects to be considered, according to one or more embodiments. A significant obstacle in underwater communication is high signal attenuation due to the conductivity of water. However, fresh water (e.g., swimming pool, river, lakes) has lower conductivity than seawater (in the range of 50-100 mS/m) and thus lower signal attenuation. Investigation has shown that several meters of communication distance under the fresh water can be achieved at low frequencies (e.g., below 1 GHz) using electromagnetic waves (EM) with narrowband signals. The primary use case applies to shallow water and water surface. For example, swimming pools are mainly up to 2 meters deep and, in the case of drowning, a person is still fighting for some time and stays on the water surface.

EM waves are a preferred choice over acoustic and optical waves because EM waves are less sensitive to reflection and refraction effects in shallow water than acoustic waves. Suspended particles causing strong backscattering and scattering due to non-line-of-sight (LOS) have little impact on EM waves compared to optical waves. Both acoustic and optical waves cannot perform smooth transitions through the air/water interface. EM waves, however, can cross water-to-air interface with minimum transition loss by following the path of least resistance. In this way, both air and water paths will act to extend the transmission wave. EM waves are also tolerant to water turbulences and thus can be used at higher frequencies than acoustic or optical waves.

The foregoing message transmission feature can be implemented by an existing wireless stack in the wearable device, such as WIFI, Bluetooth (BT), ultra-wide band (UWB), or cellular radio. In some embodiments, the transmission feature can be designed as a dedicated emergency system in the wearable device and use a low frequency band (e.g., 900 MHz or lower), or extremely low frequency (ELF) band, or a very low frequency (VLF) band, where higher transmit power is allowed (e.g., 30 dBm). Since this band is less used, and the signal is partially transmitted in water, there will be less interference with other wearable devices.

In some embodiments, because message is short and is transmitted at a low data rate, a low order modulation with lower error probability can be used to encode the message (e.g., BPSK with 2 symbols transmission). The narrow bandwidth of the transmission signal also helps to extend the range of transmission. Since the message is broadcasted there is no need for handshaking with nearby devices (e.g., no ACK/NACK).

In some embodiments, the transmission system parameters, such as antenna design, transmit power, duty cycle, data bandwidth, data rate, spreading factor, are chosen to maximize performance, as shown in FIG. 4.

In some embodiments, the wearable device uses translational acoustic-RF communication (TARF) technology to communicate with nearby devices through deeper water as part a pool alarm system infrastructure, as described in *Networking across boundaries | Proceedings of the* 2018 *Conference of the ACM Special Interest Group on Data Communication*. (n.d.). ACM Conferences. https://doi.org/10.1145/3230543.3230580.

With TARF technology an underwater acoustic transmitter emits sonar signals using a loudspeaker of the wearable device. The sonar signals travel as pressure waves of different frequencies corresponding to different data bits. When the signal reaches the surface, it causes tiny ripples in the water, only a few micrometers in height, corresponding to those frequencies, which can be detected by a poolside radar, such as a millimeter-wave frequency modulated carrier wave (FMCW) radar.

In some embodiments, the wearable devices can be used a part of a larger pool alarm system infrastructure that includes, e.g., surveillance cameras. In some embodiments, pool alarm system includes a monitor and control station, which communicates with a plurality of wearable devices. In some embodiments, alert messages are sent to the monitor and control station using sonar waves from loudspeakers of the wearable devices and the pool alarm system includes a millimeter-wave frequency modulated carrier wave (FMCW) radar configured to receive and decoder the sonar signals at the surface of the water. In some embodiments, the monitor and control system steers a camera in the direction of the user in response to the alert message. In some embodiments, the monitor and control system calls emergency services in response to the alert message.

Example Process

Figure 5:
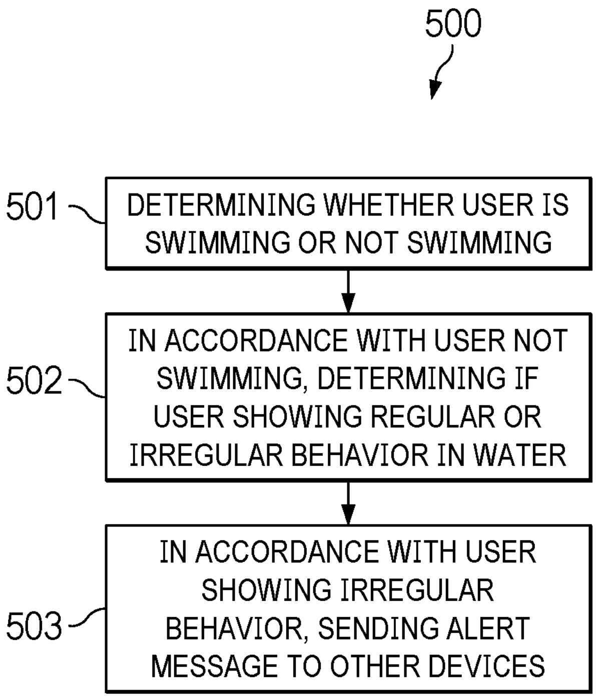
FIG. 5 is a flow diagram of a pool alarm process that uses wearable devices, according to one or more embodiments.

FIG. 5 is a flow diagram of a pool alarm process that uses wearable devices, according to one or more embodiments. Process 500 can be implemented in, e.g., device architecture 600 described in reference to FIG. 6.

Process 500 includes: determining whether a user is swimming or not swimming based on sensor data (501); in accordance with the user not swimming, determining, based on the sensor data, whether the user is showing regular or irregular behavior while swimming (502); and in accordance with the user showing irregular behavior, sending an alert message from the water over air to one or more other devices (503). In some embodiment, a machine learning model is used to determine whether the user is swimming or not swimming and whether the user is showing regular or irregular behavior. In some embodiments, at least one limb coordination metric is used as input to a trained machine learning model (e.g., a classifier) to predict regular or irregular behavior of the user in the water. In some embodiment, the message is sent from the water over the air using EM waves with narrowband signals at low frequency (e.g., below 1 GHz) or TARF technology.

Example Device Architecture

Figure 6:
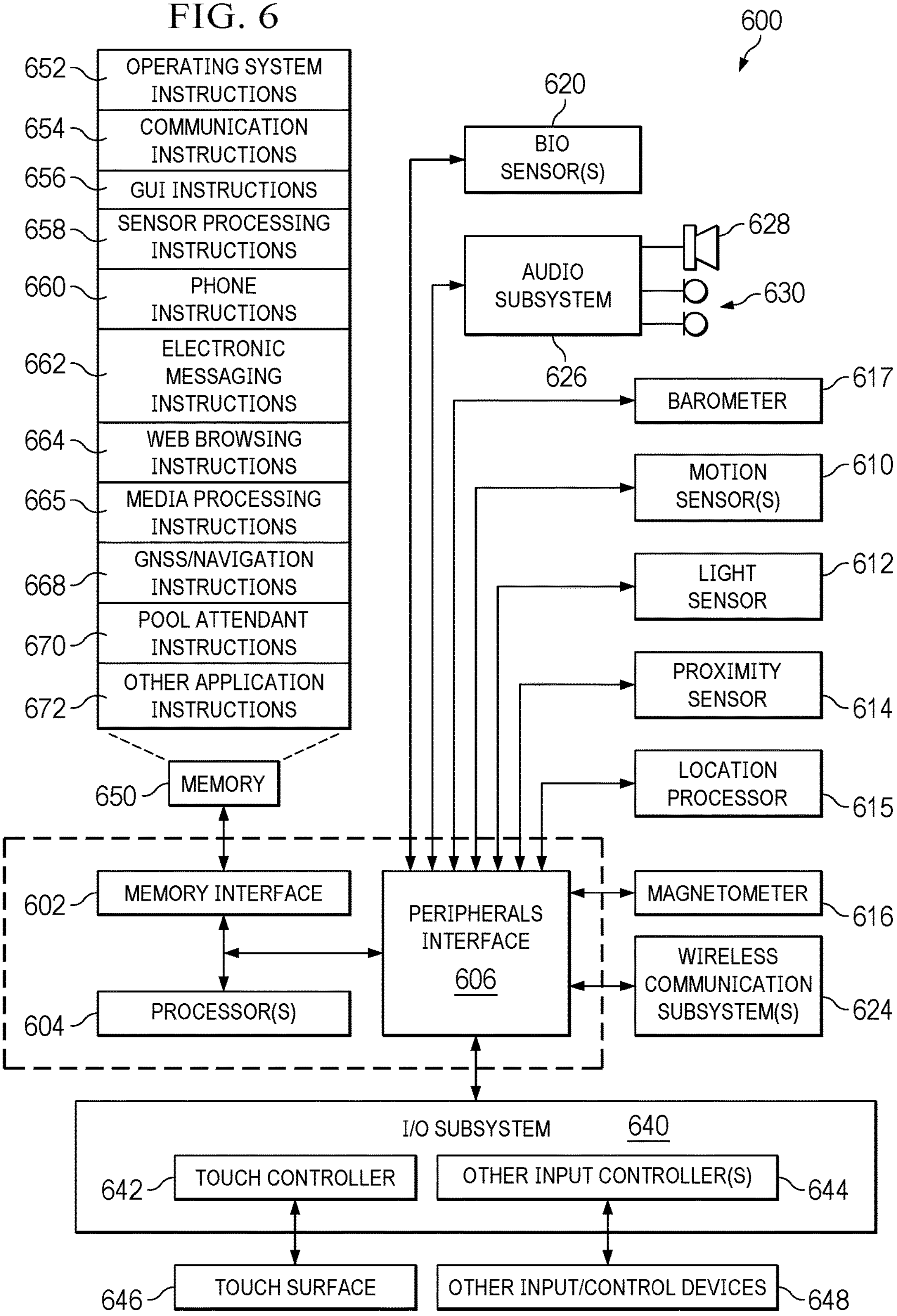
FIG. 6 is a block diagram of a device architecture for implementing the features and processes described in reference to FIGS. 1-5.

FIG. 6 is a block diagram of a device architecture 600 for implementing the features and processes described in reference to FIGS. 1-5. Architecture 600 can include memory interface 602, one or more hardware data processors, image processors and/or processors 604 and peripherals interface 606. Memory interface 602, one or more processors 604 and/or peripherals interface 606 can be separate components or can be integrated in one or more integrated circuits. System architecture 600 can be included in any suitable electronic device for pool alarm systems, including but not limited to wearable devices or devices receiving SOS messages, such as a smartwatch, smartphone, fitness band, swim googles, head or chest mounted device, or any other device that can be attached to or worn by a user.

Sensors, devices, and subsystems can be coupled to peripherals interface 606 to provide multiple functionalities. For example, one or more motion sensors 610, light sensor 612 and proximity sensor 614 can be coupled to peripherals interface 606 to facilitate motion sensing (e.g., acceleration, rotation rates), lighting and proximity functions of the wearable device. Location processor 615 can be connected to peripherals interface 606 to provide geo-positioning. In some implementations, location processor 615 can be a GNSS receiver, such as the Global Positioning System (GPS) receiver. Electronic magnetometer 616 (e.g., an integrated circuit chip) can also be connected to peripherals interface 606 to provide data that can be used to determine the direction of magnetic North. Electronic magnetometer 616 can provide data to an electronic compass application. Motion sensor(s) 610 can include one or more accelerometers and/or gyros configured to determine change of speed and direction of movement. Barometer 617 can be configured to measure atmospheric pressure (e.g., pressure change inside a vehicle). Biosensor(s) 620 can be one or more of a PPG sensor, an electroencephalogram (EEG) sensor, an electrocardiogram (ECG) sensor, an electromyogram (EMG) sensor, a mechanomyogram (MMG) sensor (e.g., piezo resistive sensor) for measuring muscle activity/contractions, an electrooculography (EOG) sensor, a galvanic skin response (GSR) sensor, a magnetoencephalogram (MEG) sensor and/or other suitable sensor(s) configured to measure bio signals.

In some embodiments, the device architecture can include a radar integrated circuit for FMCW radar to facilitate TARF transmissions, as described above.

Communication functions can be facilitated through wireless communication subsystems 624, which can include radio frequency (RF) receivers and transmitters (or transceivers) and/or optical (e.g., infrared) receivers and transmitters. The specific design and implementation of the communication subsystem 624 can depend on the communication network(s) over which a mobile device is intended to operate. For example, architecture 600 can include communication subsystems 624 designed to operate over a GSM network, a GPRS network, an EDGE network, a WiFi™ network and a Bluetooth™ network. In particular, the wireless communication subsystems 624 can include hosting protocols, such that the crash device can be configured as a base station for other wireless devices.

Audio subsystem 626 can be coupled to a speaker 628 and a microphone 630 to facilitate voice-enabled functions, such as voice recognition, voice replication, digital recording and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646. Touch surface 646 and touch surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646. Touch surface 646 can include, for example, a touch screen or the digital crown of a smart watch. I/O subsystem 640 can include a haptic engine or device for providing haptic feedback (e.g., vibration) in response to commands from processor 604. In an embodiment, touch surface 646 can be a pressure-sensitive surface.

Other input controller(s) 644 can be coupled to other input/control devices 648, such as one or more buttons, rocker switches, thumbwheel, infrared port, and USB port. The one or more buttons (not shown) can include an up/down button for volume control of speaker 628 and/or microphone 630. Touch surface 646 or other controllers 644 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 646; and a pressing of the button for a second duration that is longer than the first duration may turn power to the mobile device on or off. The user may be able to customize a functionality of one or more of the buttons. The touch surface 646 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 602 can be coupled to memory 650. Memory 650 can include high-speed random-access memory and/or non-volatile memory, such as one or more magnetic disk storage devices, one or more optical storage devices and/or flash memory (e.g., NAND, NOR). Memory 650 can store operating system 652, such as the iOS operating system developed by Apple Inc. of Cupertino, California. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers, such as, for example, instructions for implementing a software stack for wired or wireless communications with other devices. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Location instructions 668 to facilitate generic GNSS and location-related processes and instructions; and pool attendant instructions 670 that implement the processes described in reference to FIGS. 1-5. Memory 650 further includes other application instructions 672 including but not limited to instructions for applications that implement system 300 shown in FIG. 3.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A method comprising:

training a first machine learning model to detect whether a swimmer is swimming or not swimming;

training a second machine learning model to detect regular or irregular swimming behavior;

obtaining sensor data from a wearable device attached to a user, the sensor data including inertial sensor data and pressure sensor data;

determining that the user is submerged in water based on the pressure sensor data;

predicting, with the first machine learning model, whether the user is swimming or not swimming based on the inertial sensor data;

in accordance with the user being submerged and not swimming, predicting with the second machine learning model, whether the user is showing regular or irregular behavior while swimming based on the inertial sensor data; and in accordance with the user showing irregular behavior, sending an alert message from the water over air to one or more other devices.

2. The method of claim 1, wherein predicting, with the first machine learning model, whether the user is swimming or not swimming based on the inertial sensor data, further comprises:

determining, based on inertial sensor data, a set of metrics including stroke rate, stroke style, and motion energy metrics;

obtaining, from a heart rate sensor, a heart rate signal;

obtaining, from a location processor, an estimate of the user's speed; and classifying the user as swimming or not swimming based on the set of metrics, the user's heart rate and the user's estimated speed.

3. The method of claim 1, wherein predicting with the second machine learning model, whether the user is showing regular or irregular behavior while swimming based on the inertial sensor data, further comprises:

determining at least one limb coordination metric from the sensor data; and predicting, using a machine learning model, whether the user is showing regular or irregular behavior while swimming based on the at least one limb coordination metric.

4. The method of claim 3, wherein the at least one limb coordination metric is determined based on a relative position and orientation of at least one limb or the user's head relative to the user's hips.

5. The method of claim 4, wherein the relative position is determined at least in part from pressure data captured by pressure sensors attached to the limbs and head of the user.

6. The method of claim 4, wherein the at least one limb coordination metric is determined based on whether the user's limbs and head are lower than the user's hips.

7. The method of claim 1, wherein predicting with the second machine learning model, whether the user is showing regular or irregular behavior while swimming based on the inertial sensor data includes determining if the user is sinking or drifting.

8. A system comprising:

at least one processor;

a motion sensor configured to output motion data;

a biosensor configured to output a biosignal;

a pressure sensor configured to output pressure sensor data;

a communication transmitter;

memory storing instructions that when executed by the at least one processor cause the at least one processor to perform operations comprising:

predicting, with a first machine learning model, whether a user is swimming or not swimming based on the motion data and biosignal;

determining whether the user is submerged in water based on the pressure sensor data;

in accordance with the user not swimming and being submerged in water, predicting, with a second machine learning model and based on the motion data and biosignal, whether the user is showing regular or irregular behavior while swimming; and in accordance with the user showing irregular behavior, sending, using the communication transmitter, an alert message from the water over air to one or more other devices.

9. The system of claim 8, wherein predicting, with a first machine learning model, whether a user is swimming or not swimming based on the motion data and biosignal, further comprises:

determining, based on inertial sensor data, a set of metrics including stroke rate, stroke style, and motion energy metrics;

obtaining, from the biosensor, a heart rate signal;

obtaining, from a location processor, an estimate of the user's speed; and classifying the user as swimming or not swimming based on the set of metrics, the user's heart rate and the user's estimated speed.

10. The system of claim 8, wherein predicting, with a second machine learning model and based on the motion data and biosignal further comprises:

determining at least one limb coordination metric from the motion data and biosignal; and predicting, using a machine learning model, whether the user is showing regular or irregular behavior while swimming based on the at least one limb coordination metric.

11. The system of claim 10, wherein the at least one limb coordination metric is determined based on a relative position and orientation of at least one limb or the user's head relative to the user's hips.

12. The system of claim 11, where relative position of at least one limb or the user's head relative to the user's hips is determined at least in part from pressure data captured by pressure sensors attached to the limbs and head of the user.

13. The system of claim 10, wherein the at least one limb coordination metric is determined based on whether the user's limbs and head are lower than the user's hips.

14. The system of claim 8, wherein predicting, with a second machine learning model and based on the motion data and biosignal comprises determining if the user is sinking or drifting.

15. A system comprising:

a monitor and control station; and a plurality of wearable devices configured to:

predict, with a first machine learning model, whether a user is swimming or not swimming based on inertial sensor data output by inertial sensors of the wearable devices;

determine whether the user is submerged in water based on pressure sensor data output by pressure sensors of the wearable devices;

in accordance with the user not swimming and being submerged in water, predict, with a second machine learning model and based on the inertial sensor data, whether the user is showing regular or irregular behavior while swimming; and in accordance with the user showing irregular behavior, sending an alert message to the monitor and control station.

16. The system of claim 15, wherein the alert message is sent from the water over air using electromagnetic waves and narrowband signals in a low frequency band.

17. The system of claim 15, wherein the alert message is sent using sonar from a loudspeaker of the wearable device, and the system further comprises:

a millimeter-wave frequency modulated carrier wave (FMCW) radar configured to receive and decoder the sonar signals at the surface of the water.

18. The system of claim 17, wherein the monitor and control system steer a camera in the direction of the user in response to the alert message.

19. The system of claim 17, wherein the monitor and control system call emergency services in response to the alert message.

* * * * *